(12) United States Patent
Chen et al.

(10) Patent No.: US 10,184,571 B2
(45) Date of Patent: Jan. 22, 2019

(54) VALVE STRUCTURE WITH ELASTIC ANTI-LEAKAGE MEMBER

(71) Applicants: SHOWER KAOKANG ENTERPRISE CO., LTD., Changhua (TW); Shen-En Chiang, Taichung (TW)

(72) Inventors: Chao-Chi Chen, Changhua (TW); Shen-En Chiang, Taichung (TW)

(*) Notice: Subject to any disclaimer, the term of this patent is extended or adjusted under 35 U.S.C. 154(b) by 0 days.

(21) Appl. No.: 15/601,923

(22) Filed: May 22, 2017

(65) Prior Publication Data

US 2018/0245703 A1    Aug. 30, 2018

(30) Foreign Application Priority Data

Feb. 24, 2017 (TW) .............................. 106106557 A (51) Int. Cl.
*F16K 5/04* (2006.01)
*F16K 1/46* (2006.01)
*F16K 11/085* (2006.01)

(52) U.S. Cl.
CPC .............. *F16K 5/0478* (2013.01); *F16K 1/46* (2013.01); *F16K 5/0407* (2013.01); *F16K 11/0853* (2013.01); *F16K 5/045* (2013.01)

(58) Field of Classification Search
CPC .. F16K 11/085; F16K 11/0853; F16K 5/0492; F16K 5/0478; F16K 5/0471; F16K 5/04; F16K 5/045; Y10T 137/8782; Y10T 137/86541; Y10T 137/87909
USPC ........ 137/876, 887, 625.16; 251/314–317.01
See application file for complete search history.

(56) References Cited

U.S. PATENT DOCUMENTS

2006/0027779 A1* 2/2006 McGuire et al. ............. 251/309
2009/0120519 A1* 5/2009 Chen ........................ 137/625.46

* cited by examiner

*Primary Examiner* — Michael R Reid
(74) *Attorney, Agent, or Firm* — The Law Office of Austin Bonderer, PC; Austin Bonderer (57) ABSTRACT

A valve structure with an elastic anti-leakage member includes a spool, a seat, and a switch. The spool body has at least one inner notch formed on a side of the spool body, and the inner notch has at least one elastic anti-leakage member installed in the inner notch, and the seat has an inner chamber with an internal cavity wall. The spool is contained in an inner of the seat, and the elastic anti-leakage member installed in the inner chamber of the inner notch of the spool body has a surface elastically abutting against the internal cavity wall of the inner chamber of the seat to achieve a good water anti-leakage effect.

4 Claims, 9 Drawing Sheets

Prior Art

FIG.8

Prior Art

FIG.9

VALVE STRUCTURE WITH ELASTIC ANTI-LEAKAGE MEMBER

FIELD OF THE INVENTION

The present invention relates to a valve structure with an elastic anti-leakage member, and more particularly to the valve structure applied in the area of water anti-leakage switch.

BACKGROUND OF THE INVENTION

Description of the Related Art

Figure 8:
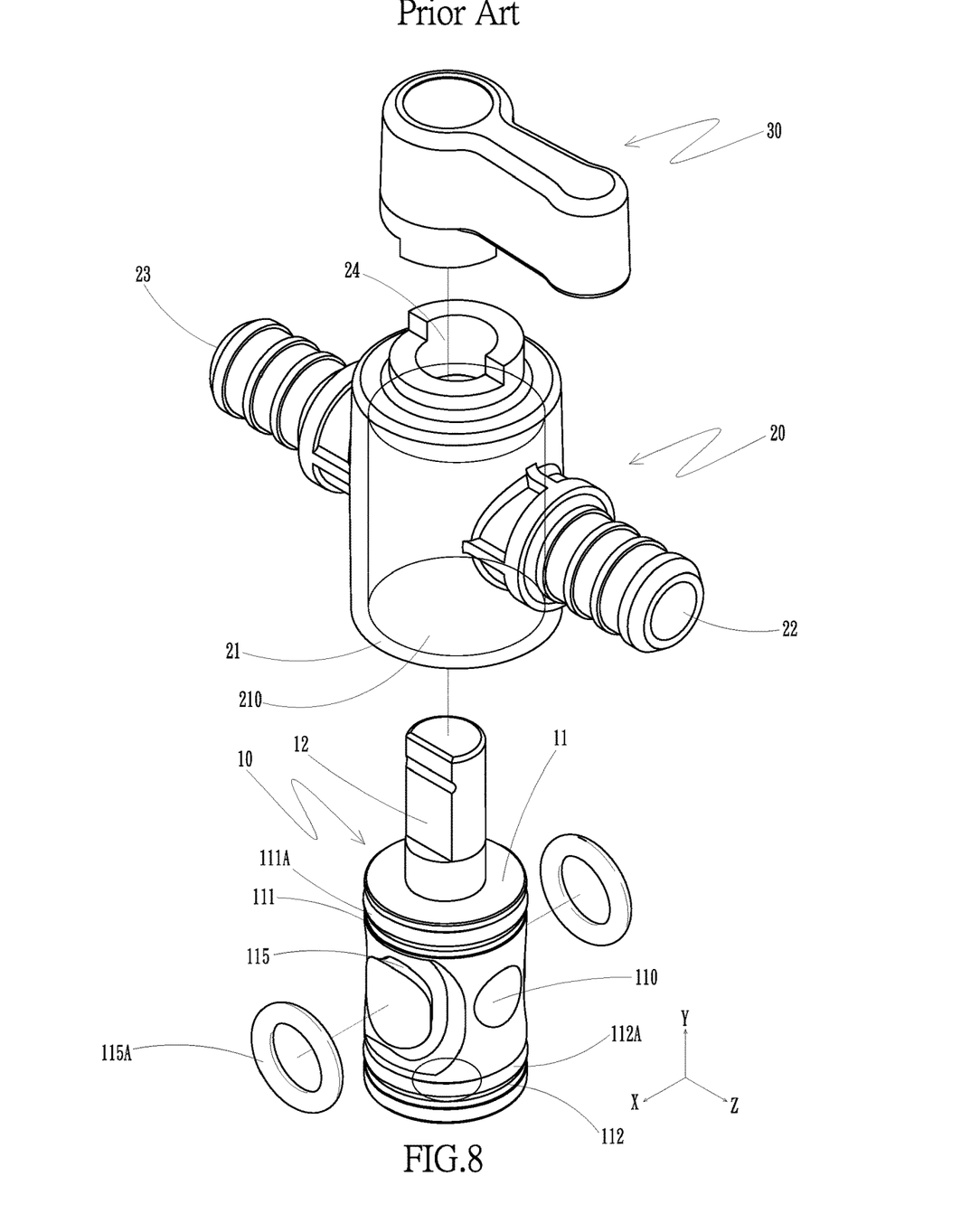
FIG. 8 is an exploded view of a conventional water outlet valve structure.
Figure 9:
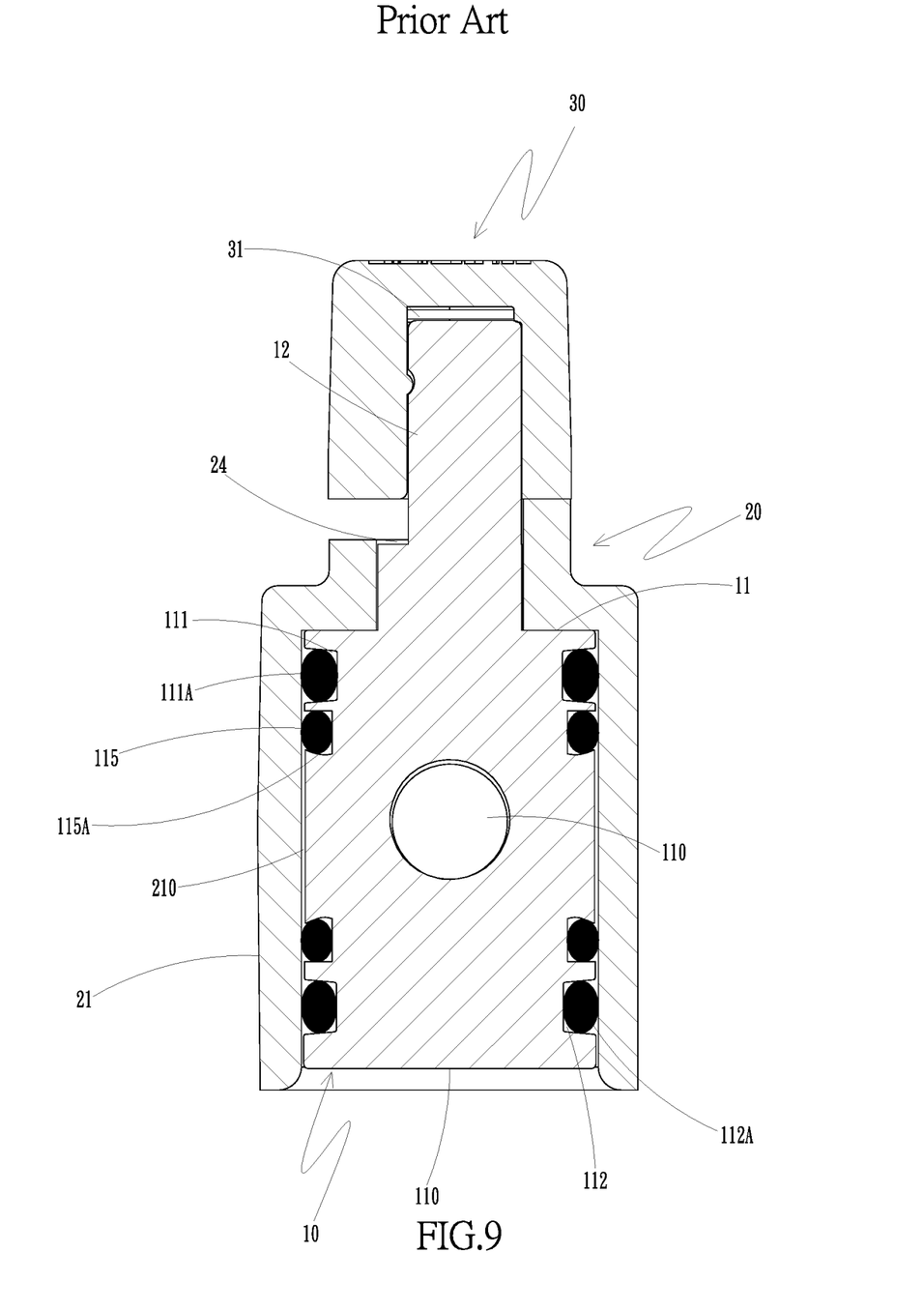
FIG. 9 is a side sectional view of a conventional water outlet valve structure.

With reference to FIGS. 8 and 9 for a conventional water outlet valve structure, the conventional water outlet valve structure comprises a spool 10, a seat 20 and a switch 30, and the spool 10 has a spool body 11, a spool shaft 12 extended upwardly in the Y-axis direction from the spool body 11, a diversion port 110 formed on a side of the spool body 11 and inwardly communicated with a side of the spool body 11 in the Z-axis direction, an upper ring groove 111 and a lower ring groove 112 formed on upper and lower sides proximate to the edges of the spool body 11 respectively, an upper elastic anti-leakage ring 111A contained in the upper ring groove 111, a lower elastic anti-leakage ring 112A contained in the lower ring groove 112, a side ring groove 115 inwardly and concavely formed on both sides of the spool body 11 in the X-axis direction, and an anti-leakage ring 115A fixed to the side ring groove 115, and the seat 20 has an inner chamber 21 with an internal cavity wall 210, an inlet portion 22 and at least one outlet portion 23 disposed at an edge of the seat 20, a top through hole 24 formed at the top of the seat 20, wherein the spool 10 is contained in the seat 20 of the inner chamber 21, and the diversion port 110 of the spool body 11 is configured to be corresponsive to the outlet portion 22 and outlet portion 23 of the seat 20, and the upper ring groove 111 of the spool body 11, and the upper elastic anti-leakage ring 111A, the lower elastic anti-leakage ring 112A and the anti-leakage ring 115A of the lower ring groove 112 elastically abut against the internal cavity wall 210 of the inner chamber 21 of the seat 20, and the spool shaft 12 of the spool 10 is passed out from the top through hole 24 formed at the top of the seat 20, and coupled to the switch 30. The upper elastic anti-leakage ring 111A, the lower elastic anti-leakage ring 112A and the anti-leakage ring 115A of the upper ring groove 111, the lower ring groove 112 and the side ring groove 115 of the spool body 11 elastically abut against the internal cavity wall 210 of the inner chamber 21 of the seat 20 to achieve the anti-leakage effect, but the elastic anti-leakage ring 111A, the lower elastic anti-leakage ring 112A and the anti-leakage ring 115A just abut at the internal cavity wall 210 by a linear contact only, so that if the water temperature is close to 0 degree or the water pressure is above 80 PSI, the anti-leakage effect will drop. If a small foreign substance (such as hair) enters between the anti-leakage ring 115A and the internal cavity wall 210, the anti-leakage effect is totally lost. Obviously, the conventional water outlet valve structure requires improvements.

SUMMARY OF THE INVENTION

In view of the deficiency of the conventional water outlet valve structure, the inventor of the present invention provides a valve structure with an elastic anti-leakage member to overcome the deficiency of the prior art.

Therefore, it is a primary objective of the present invention to provide a valve structure with an elastic anti-leakage member comprising a spool, a seat and a switch, characterized in that the spool has a spool body, a spool shaft extended upwardly in the Y-axis direction from the spool body, a diversion port inwardly communicated with a side of the spool body in the Z-axis direction, an upper ring groove and a lower ring groove formed at edges proximate to the spool body, an upper elastic anti-leakage ring contained in the upper ring groove, a lower elastic anti-leakage ring contained in the lower ring groove, at least one inner notch inwardly and concavely formed on at least one side of the spool body in the X-axis direction, and an elastic anti-leakage member contained in the inner notch; wherein the inner notch has a positioning and fixing protrusion and the elastic anti-leakage member has a latch defined as a recess, and the latch of the elastic anti-leakage member defined as the recess is latched to the positioning and fixing protrusion of the inner notch; and the seat has an inner chamber with an internal cavity wall, and an inlet portion and an outlet portion disposed on a side of the seat, a top through hole formed at the top of the seat, and the switch has a positioning and fixing hole formed at the bottom of the switch, and the spool is contained in the inner chamber of the seat, and the diversion port of the spool body is configured to be corresponsive to the inlet portion and the outlet portion of the seat, and the upper elastic anti-leakage ring and the lower elastic anti-leakage ring of the upper ring groove and the lower ring groove of the spool body elastically abut against the internal cavity wall of the inner chamber and by a linear contact, and the elastic anti-leakage member of the inner notch of the spool body elastically abut against the internal cavity wall of the inner chamber and by a surface contact, and the top through hole being provided for passing out the spool shaft of the spool and latching and fixing the positioning and fixing hole of the switch. Therefore, the upper elastic anti-leakage ring and the lower elastic anti-leakage ring of the upper ring groove and the lower ring groove of the spool body elastically abut against the internal cavity wall of the inner chamber to achieve the anti-leakage effect, the elastic anti-leakage member of the inner notch of the spool body elastically abuts against and the internal cavity wall of the inner chamber and by a surface contact to achieve the anti-leakage effect for low water temperature and high water pressure. When the switch is rotated and turned on, the diversion port of the spool body is configured to be corresponsive to the inlet portion and the outlet portion of the seat. When the switch is rotated and turned off, the elastic anti-leakage member installed at the inner notch of the spool is configured to be corresponsive to the inlet portion and the outlet portion of the seat for the control of stopping water, and the water pressure will push the elastic anti-leakage member installed at the inlet portion of the seat, so that the elastic anti-leakage member installed at the outlet portion of the seat further abuts the outlet portion to achieve the overall anti-leakage effect effectively. Even if there is a small foreign substance (such as hair) in the water entering between the elastic anti-leakage member and the inner cavity wall, the elastic anti-leakage member still can maximize the sealing effect effectively to provide an excellent anti-leakage function.

The above and other objects, features and advantages of this disclosure will become apparent from the following detailed description taken with the accompanying drawings.

DESCRIPTION OF THE PREFERRED EMBODIMENTS

Figure 1:
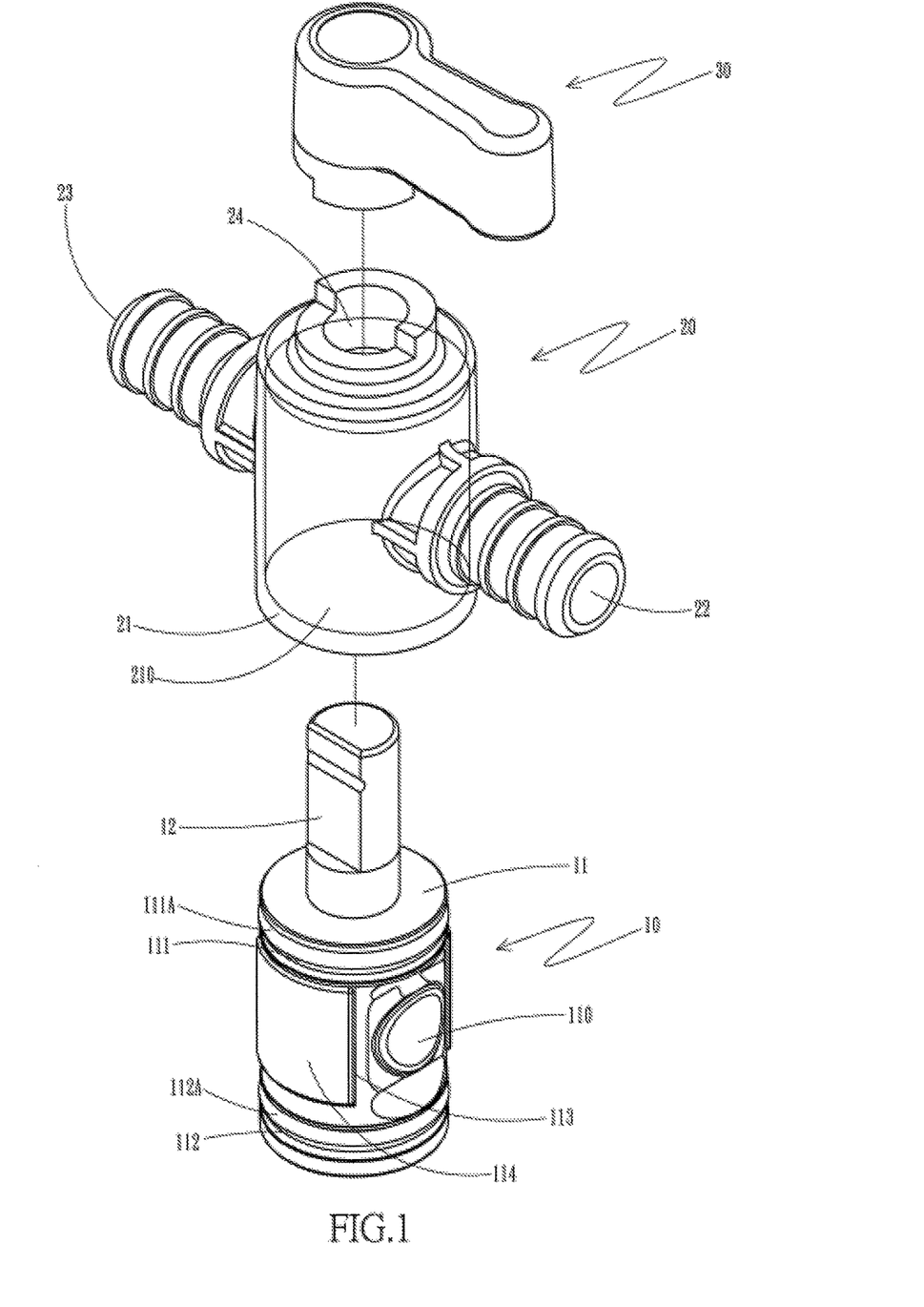
FIG. 1 is a partial perspective exploded view of a valve structure with an elastic anti-leakage member of the present invention.
Figure 2:
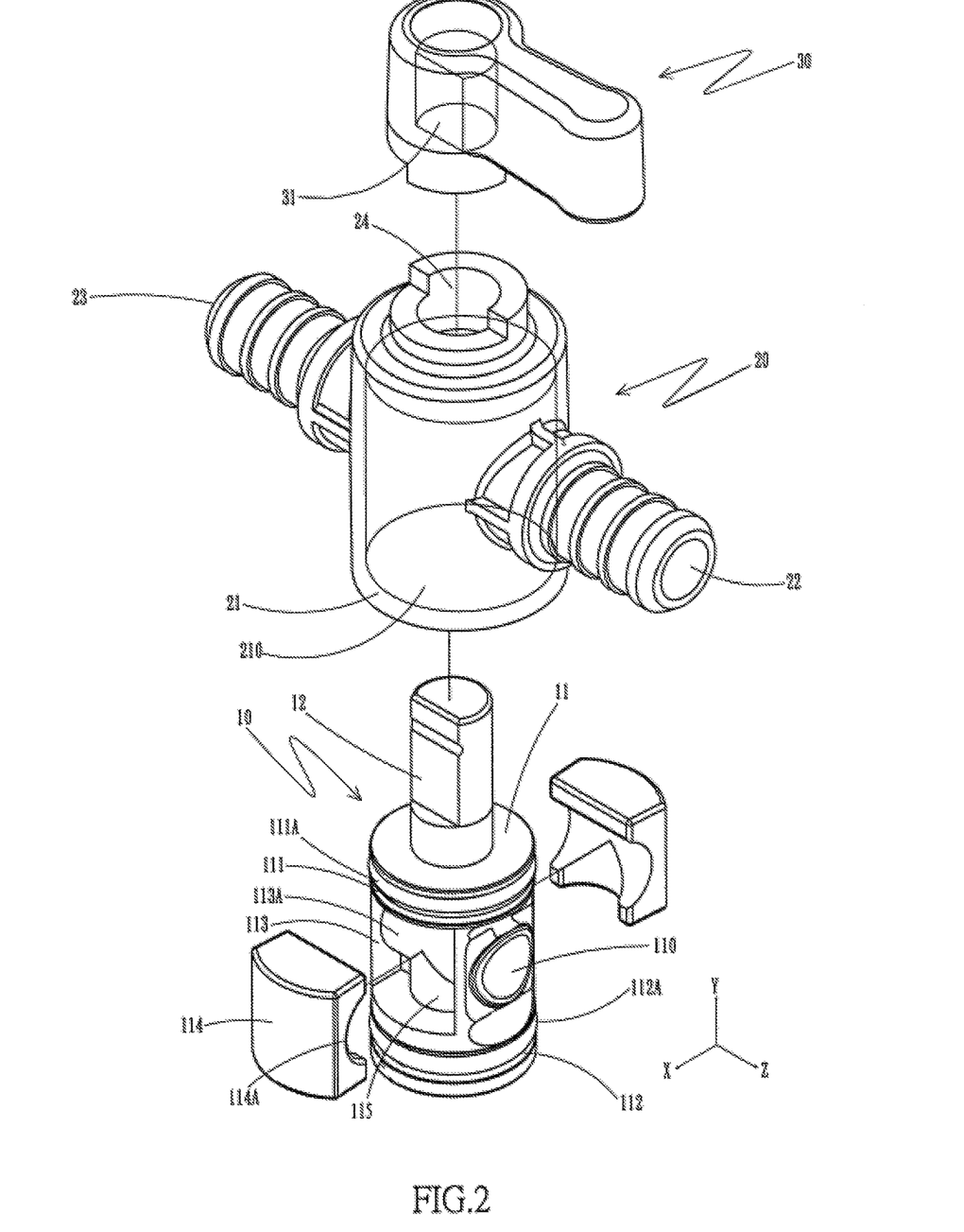
FIG. 2 is a detailed partial perspective exploded view of a valve structure with an elastic anti-leakage member of the present invention.
Figure 3:
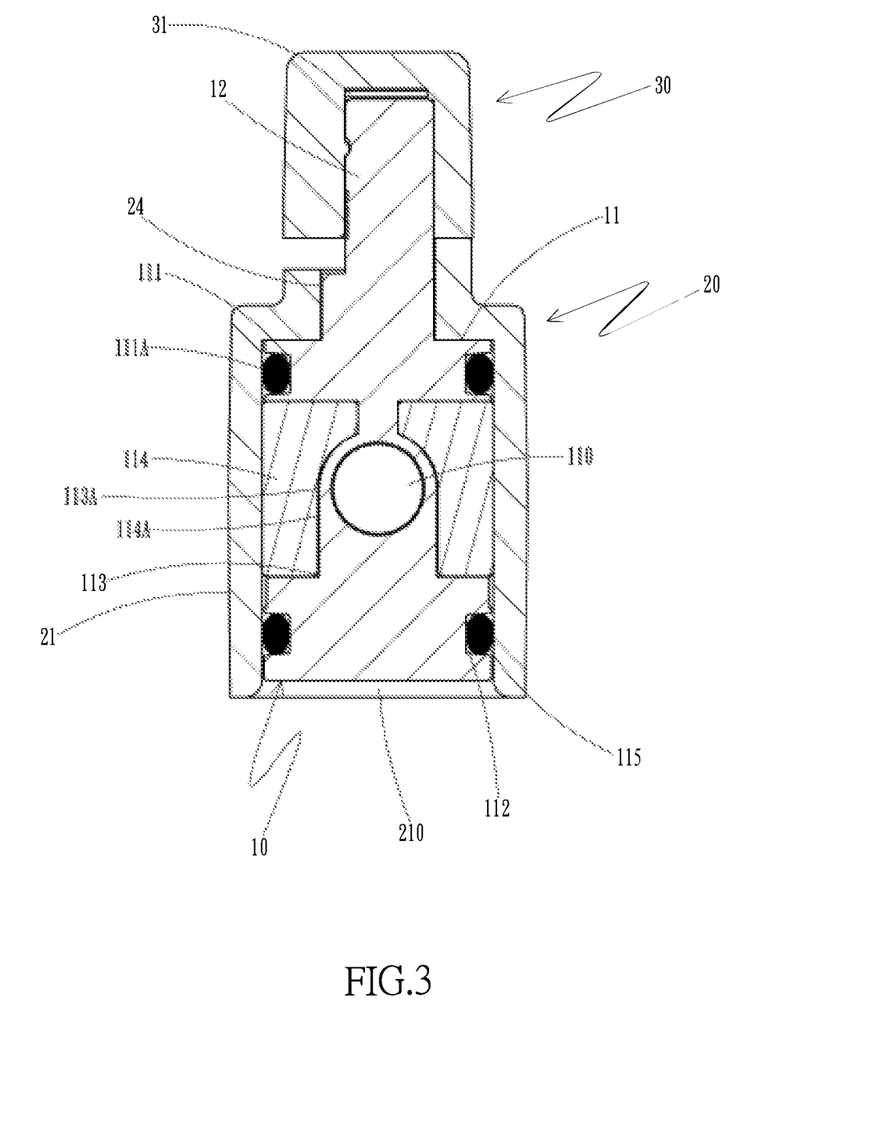
FIG. 3 is a side sectional view of a valve structure with an elastic anti-leakage member of the present invention.

With reference to FIGS. 1 to 3 for a partial exploded view, a detailed exploded view and a side sectional view of a valve structure with an elastic anti-leakage member of the present invention respectively, the valve structure comprises the following elements:

A spool 10 includes a spool body 11, a spool shaft 12 extended upwardly in the Y-axis direction from the spool body 11, a diversion port 110 inwardly communicated with a side of the spool body 11 in the Z-axis direction, an upper ring groove 111 and a lower ring groove 112 formed at edges proximate to upper and lower sides of the spool body 11 respectively, an upper elastic anti-leakage ring 111A contained in the upper ring groove 111, a lower elastic anti-leakage ring 112A contained in the lower ring groove 112, an inner notch 113 inwardly and concavely formed on both sides of the spool body 11 in the X-axis direction, and an elastic anti-leakage member 114 contained in the inner notch 113, wherein the inner notch 113 has a positioning and fixing protrusion 113A, and the elastic anti-leakage member 114 has a latch defied as a recess 114A, and the latch of the elastic anti-leakage member 114 defined as the recess 114A is latched to the positioning and fixing protrusion 113A of the inner notch 113. The fixing protrusion 113A comprises the exterior of the diversion port 110. A vertical member 115, whose axis intersects with that of the diversion port, extending from the bottom of the inner notch and attached to the diversion port 110 can also be seen in FIGS. 2-7. The inner notch 113 comprises diversion port space on either side of the diversion port and the vertical member space on either side of the vertical member 115, as can be seen in FIGS. 2-7.

The elastic anti-leakage member 114 comprises an upper projection and two lower projections, wherein the upper projection abuts the diversion port 110 the lower projections abut the vertical member 115.

A seat 20 includes an inner chamber 21 with an internal cavity wall 210, an inlet portion 22 and an outlet portion 23 disposed at an edge of the seat 20, and a top through hole 24 formed at the top of the seat 20, wherein the inner chamber 21 is provided for containing and installing the spool 10, and the inlet portion 22 and the outlet portion 23 are configured to be opposite to the diversion port 110 of the spool body 11, and the internal cavity wall 210 of the inner chamber 21 and the upper elastic anti-leakage ring 111A and the lower elastic anti-leakage ring 112A of the upper ring groove 111 and the lower ring groove 112 of the spool body 11 abut against each other by a linear contact, and the internal cavity wall 210 of the inner chamber 21 and the elastic anti-leakage member 114 at the inner notch 113 of the spool body 11 abut against each other by a surface contact, and the spool 10 of the top through hole 24 is passed out from the spool shaft 12.

A switch 30 includes a positioning and fixing hole 31 formed at the bottom of the switch 30 and provided for passing out the spool shaft 12 of the spool 10 from the top through hole 24 of the seat 20 and fixing the spool shaft 12 to the positioning and fixing hole 31.

The valve structure with an elastic anti-leakage member in accordance with the present invention is formed by the aforementioned elements.

With reference to FIGS. 1 to 3 for a partial exploded view, a detailed exploded view and a side sectional view of a valve structure with an elastic anti-leakage member of the present invention respectively, the spool 10 is contained and installed in the inner chamber 21 of the seat 20, and the diversion port 110 of the spool body 11 is configured to be corresponsive to the inlet portion 22 and the outlet portion 23 of the seat 20, and the upper elastic anti-leakage ring 110A and the lower elastic anti-leakage ring 112A of the upper ring groove 111 and the lower ring groove 112 of the spool body 11 elastically abut the internal cavity wall 210 of the inner chamber 21 of the seat 20 by a linear contact, and the elastic anti-leakage member 114 of the inner notch 113 of the spool body 11 elastically abut the internal cavity wall 210 of the inner chamber 21 of the seat 20 by a surface contact, and the spool shaft 12 of the spool 10 is passed out from the top through hole 24 at the top of the seat 20 and fixed to the positioning and fixing hole 31 of the switch 30. In summation, the upper elastic anti-leakage ring 111A and lower elastic anti-leakage ring 112A of the upper ring groove 111 and the lower ring groove 112 elastically abut the internal cavity wall 210 of the inner chamber 21 of the seat 20 to achieve the anti-leakage effect, and the elastic anti-leakage member 114 of the inner notch 113 of the spool body 11 elastically abut the internal cavity wall 210 of the inner chamber 21 of the seat 20 to achieve the normal water anti-leakage effect, so that a good seal can be maintained at conditions including a water temperature approaching 0 degree or a water pressure above 80 PSI. When the switch 30 is rotated and turned on, the diversion port 110 of the spool body 11 is configured to be corresponsive to the inlet portion 22 and the outlet portion 23 of the seat 20 for the control of inputting water. When the switch 30 is rotated and turned off, the elastic anti-leakage member 114 of the inner notch 113 of the spool 10 is configured to be corresponsive to the inlet portion 22 and the outlet portion 23 of the seat 20 for the control of stopping the water, and the water pressure will push the elastic anti-leakage member 114 configured to be corresponsive to the inlet portion 22 of the seat 20, so that the elastic anti-leakage member 114 configured to be corresponsive to the outlet portion 23 of the seat 20 further abuts against the outlet portion 23 to improve the overall sealing effect effectively. Even if there is a small foreign substance (such as hair) entering between the elastic anti-leakage member 114 and the internal cavity wall 210, the elastic anti-leakage member 114 still can maximize the sealing effect effectively to provide an excellent anti-leakage function.

Figure 4:
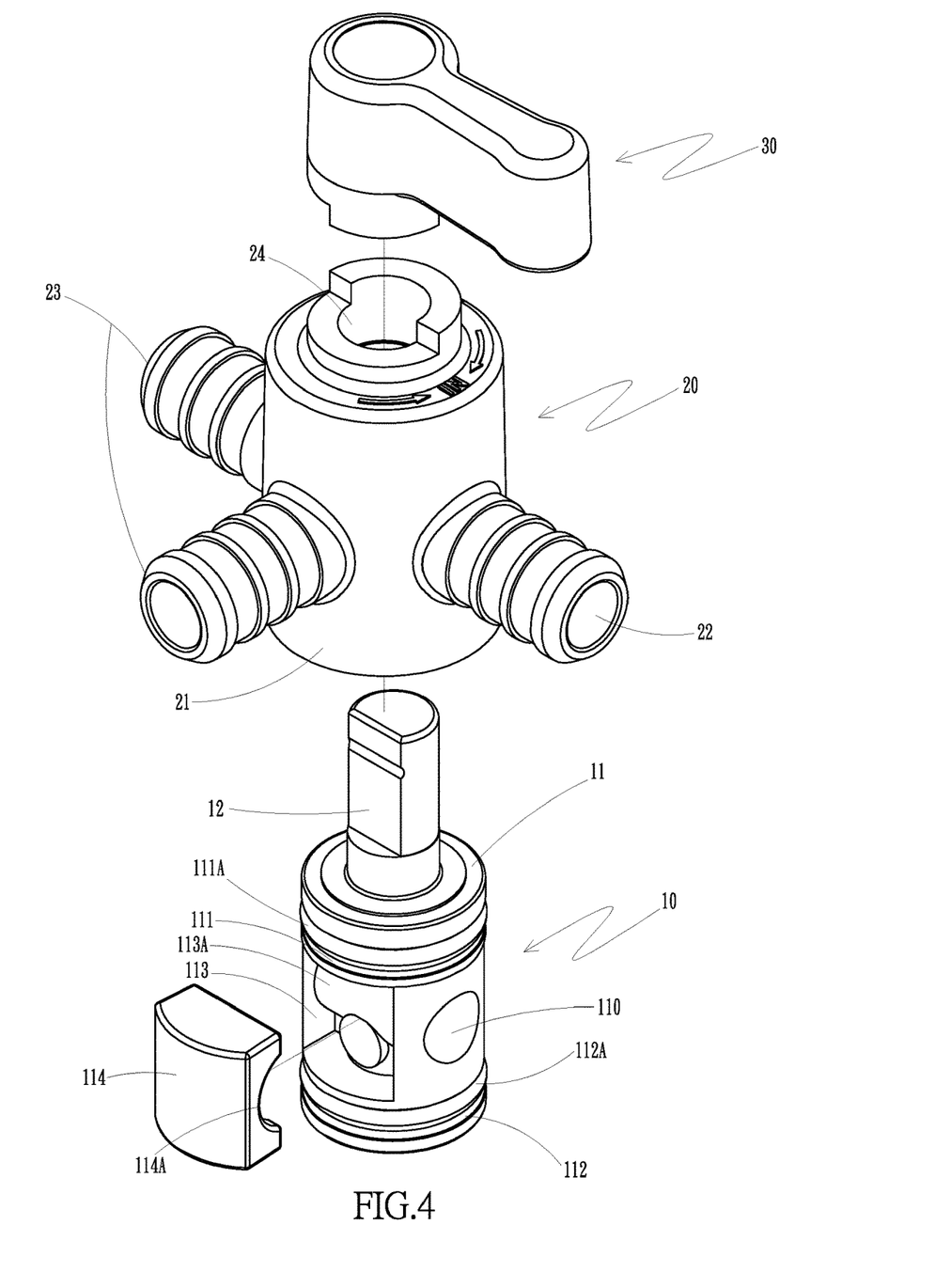
FIG. 4 is a schematic view of a valve structure with an elastic anti-leakage member having an inner notch and the elastic anti-leakage member installed on a side of a spool and three outlet portions disposed on a side of a seat in accordance with a first preferred embodiment of the present invention.
Figure 5:
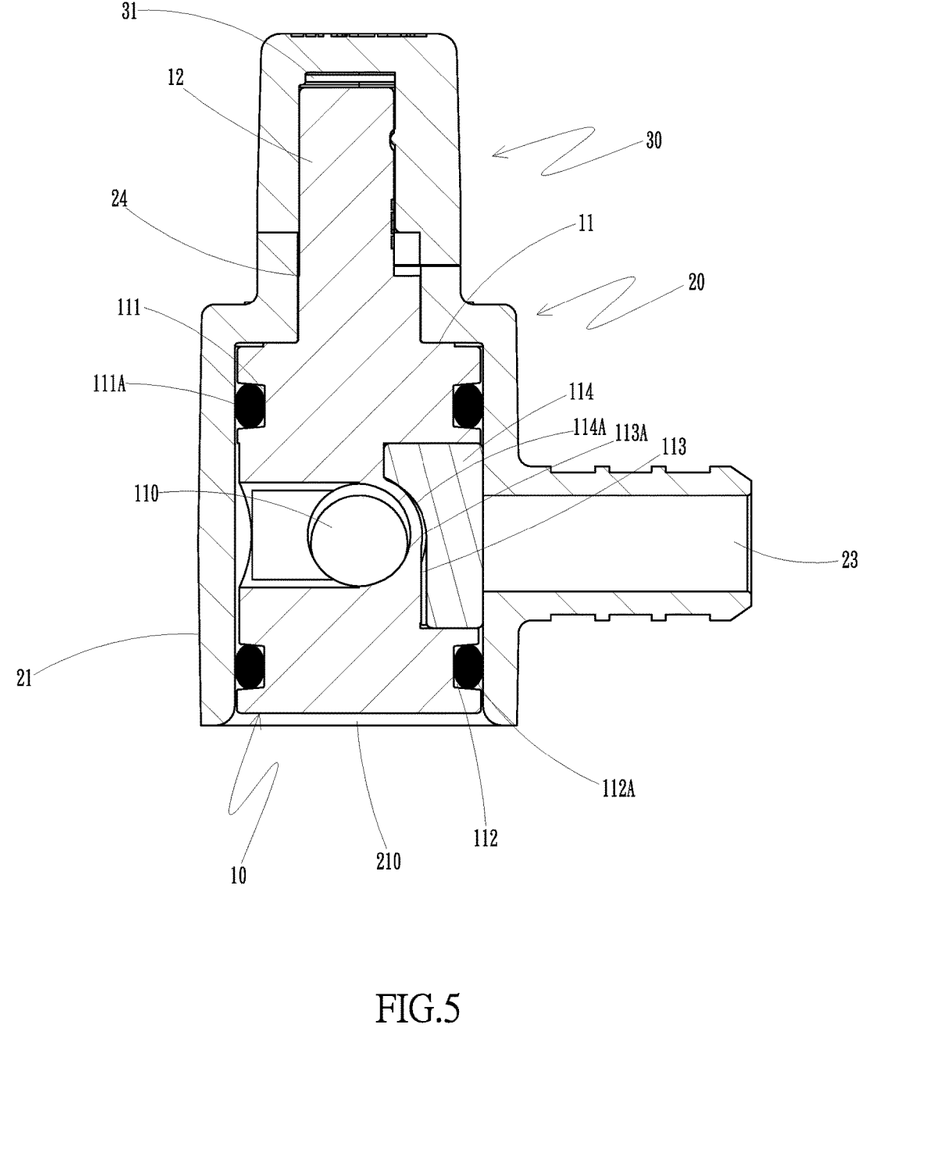
FIG. 5 is a side sectional view of a valve structure with an elastic anti-leakage member having an inner notch and the elastic anti-leakage member installed on a side of a spool and three outlet portions disposed on a side of a seat in accordance with the first preferred embodiment of the present invention.
Figure 6:
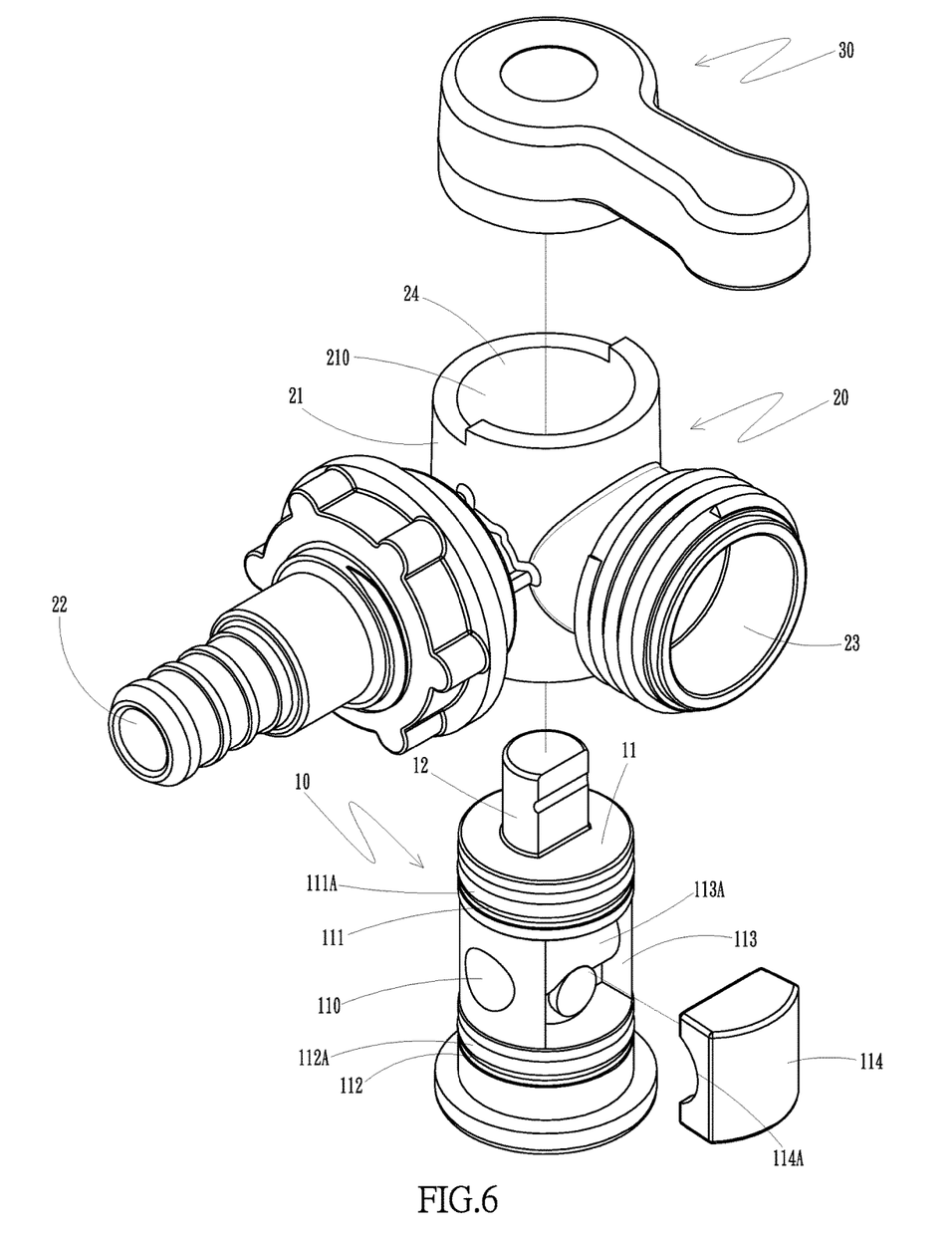
FIG. 6 is a schematic view of a valve structure with an elastic anti-leakage member having an inner notch and the elastic anti-leakage member installed on a side of a spool and two outlet portions disposed on a side of a seat in accordance with a second preferred embodiment of the present invention.
Figure 7:
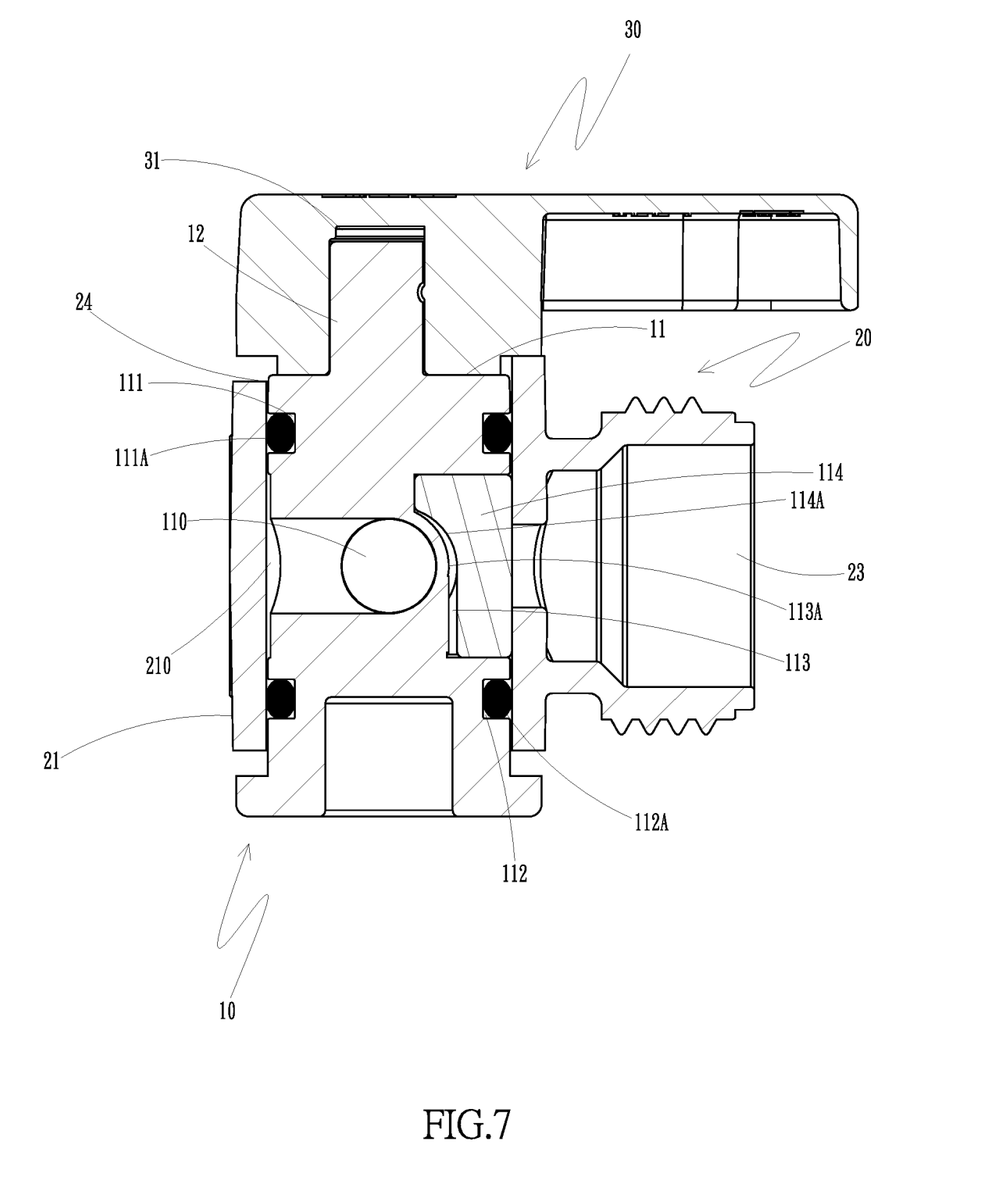
FIG. 7 is a side sectional view of a valve structure with an elastic anti-leakage member having an inner notch and the elastic anti-leakage member installed on a side of a spool and two outlet portions disposed on a side of a seat in accordance with the second preferred embodiment of the present invention.

With reference to FIGS. 4 and 5 for the schematic view and the side sectional view of a valve structure with an elastic anti-leakage member having an inner notch and an elastic anti-leakage member installed on a side of a spool and three outlet portions disposed on a side of a seat in accordance with the first preferred embodiment of the present invention and FIGS. 6 and 7 for the schematic view and the side sectional view of a valve structure with an elastic anti-leakage member having an inner notch and an elastic anti-leakage member installed on a side of a spool and three outlet portions disposed on a side of a seat in accordance with the first preferred embodiment of the present invention respectively, the overall structure is substantially the same as that as shown in FIGS. 1 to 3 with an exception that an inner notch 113 and an elastic anti-leakage member 114 are disposed on a side of the spool 10, and an inlet portion 22 and two outlet portions 23 are disposed at relative position of the seat 20, or the inner notch 113 and the elastic anti-leakage member 114 are disposed on a side of the spool 10, and an inlet portion 22 and an outlet portion 23 are configured to be 90° with respect to the seat 20. After the spool shaft 12 of the spool 10 is rotated, controlled and linked by the switch 30, the diversion port 110 of the spool 10 is selectively configured to be corresponsive to the outlet portion 23 of the seat 20, so as to fit the application to different valve structures to improve the practicality of the present invention.

While the invention has been described by means of specific embodiments, numerous modifications and variations could be made thereto by those skilled in the art without departing from the scope and spirit of the invention set forth in the claims. In addition, the present invention complies with patent application requirements, and is thus duly filed for patent application.

What is claimed is:

1. A valve comprising:
a spool comprising a spool body, a spool shaft extended upwardly from the spool body, an upper elastic anti-leakage ring, a lower elastic anti-leakage ring, a vertical member and an elastic anti-leakage member; wherein the spool defines two openings with a diversion port connecting the two openings; a fixing protrusion comprising an exterior of the diversion port; an upper ring groove, with the upper elastic anti-leakage ring at least partially located therein; a lower ring groove, with the lower elastic anti-leakage ring at least partially located therein; and an inner notch with the elastic anti-leakage member therein;
a seat, comprising an inner chamber with an internal cavity wall, an inlet portion, and an outlet portion disposed on a side of the seat, a top through hole formed at the top of the seat, and the inner chamber being provided for containing and installing the spool, and the inlet portion and the outlet portion being configured to be corresponsive to the diversion port of the spool body, and the internal cavity wall of the inner chamber and the upper elastic anti-leakage ring and the lower elastic anti-leakage ring of the upper ring groove and the lower ring groove of the spool body elastically abutting against each other by a linear contact, and the internal cavity wall of the inner chamber and the elastic anti-leakage member of the inner notch of the spool body elastically abutting against each other by a surface contact, and the top through hole being provided for passing out the spool shaft of the spool; and
a switch, having a positioning and fixing hole formed at the bottom of the switch for fixing and combining the spool shaft of the spool which passes out from the top through hole of the seat;
wherein the inner notch is defined by the spool body, the fixing protrusion, and the vertical member that extends from the diversion port to the spool body; an axis of the vertical member intersects the diversion port; the inner notch comprises diversion port space, on either side of the diversion port, and a vertical member space, on either side of the vertical member; the elastic anti-leakage member defines a recess that corresponds to the fixing protrusion and the vertical member; and the elastic anti-leakage member substantially fully occupies the inner notch.

2. The valve according to claim 1, wherein when the spool shaft is rotated by actuation of the switch, the diversion port can be aligned with the outlet portion.

3. The valve according to claim 1, wherein the spool body defines two inner notches and each inner notch has one elastic anti-leakage member therein.

4. The valve according to claim 1, wherein the elastic anti-leakage member comprises an upper projection and two lower projections wherein the upper projection abuts the fixing protrusion and the two lower projections abut the vertical member.

* * * * *